(12) United States Patent
Plagges et al.

(10) Patent No.: US 12,158,770 B1
(45) Date of Patent: Dec. 3, 2024

(54) POWER-EFFICIENT ENABLE SIGNAL FOR FANIN-BASED SEQUENTIAL CLOCK GATING ON ENABLED FLIP FLOPS

(71) Applicant: Synopsys, Inc., Sunnyvale, CA (US)

(72) Inventors: Wladimir Plagges, Santiago (CL); Muzaffer Hiraoglu, Marlborough, MA (US); Esteban Osses, Santiago (CL)

(73) Assignee: Synopsys, Inc., Sunnyvale, CA (US)

( * ) Notice: Subject to any disclaimer, the term of this patent is extended or adjusted under 35 U.S.C. 154(b) by 190 days.

(21) Appl. No.: 17/827,124

(22) Filed: May 27, 2022

Related U.S. Application Data

(60) Provisional application No. 63/194,127, filed on May 27, 2021.

(51) Int. Cl.
| | |
|---|---|
| *G06F 1/10* | (2006.01) |
| *G06F 1/08* | (2006.01) |
| *G06F 1/3287* | (2019.01) |
| *G06F 9/30* | (2018.01) |
| *G06F 9/38* | (2018.01) |
| *G06F 30/396* | (2020.01) |
| *G06F 117/04* | (2020.01) |

(52) U.S. Cl.
CPC .................. *G06F 1/08* (2013.01); *G06F 1/10* (2013.01); *G06F 1/3287* (2013.01); *G06F 9/30029* (2013.01); *G06F 9/3869* (2013.01); *G06F 30/396* (2020.01); *G06F 2117/04* (2020.01)

(58) Field of Classification Search
CPC . G06F 1/08; G06F 1/10; G06F 1/3287; G06F 9/30029; G06F 9/3869; G06F 30/396; G06F 2117/04
See application file for complete search history.

(56) References Cited

U.S. PATENT DOCUMENTS

| | | | |
|---|---|---|---|
| 6,393,579 B1 * | 5/2002 | Piazza .................... | G06F 9/3867 712/E9.063 |
| 8,635,578 B1 | 1/2014 | Rahim et al. | |
| 8,656,326 B1 | 2/2014 | Rahim et al. | |
| 8,984,469 B2 | 3/2015 | Rahim et al. | |
| 2004/0257139 A1 * | 12/2004 | Shelor .................... | G06F 1/3237 327/295 |
| 2008/0301594 A1 * | 12/2008 | Jiang ...................... | G06F 30/396 716/132 |
| 2020/0073433 A1 * | 3/2020 | Aune ................... | G06F 30/3308 |

* cited by examiner

*Primary Examiner* — Jaweed A Abbaszadeh
*Assistant Examiner* — Brian J Corcoran
(74) *Attorney, Agent, or Firm* — Weaver Austin Villeneuve & Sampson LLP

(57) ABSTRACT

A circuit includes, in part, first and second sequential elements and a clock gating circuit. The first sequential element has an enable terminal receiving a first enabling signal, a clock terminal receiving a first clock signal, a data input terminal and a data output terminal. The second sequential element has a clock terminal, and a data input terminal coupled to the data output terminal of the first sequential element. The clock gating circuit is coupled to the first and second sequential elements and includes, in part, a third sequential element configured to store data in response to the first enabling signal and a second enabling signal. The clock gating circuit is further configured to supply a second clock signal to the clock terminal of the second sequential element in response to an assertion of the second enabling signal and the data stored in the third sequential element.

20 Claims, 7 Drawing Sheets

POWER-EFFICIENT ENABLE SIGNAL FOR FANIN-BASED SEQUENTIAL CLOCK GATING ON ENABLED FLIP FLOPS

RELATED APPLICATION

The present application claims benefit under 35 USC 119 (e) of U.S. Patent Application No. 63/194,127 filed May 27, 2021, the content of which is incorporated herein by reference in its entirety.

TECHNICAL FIELD

The present application relates to integrated circuits, and more particularly to controlling the clock signals applied to sequential elements in integrated circuits.

BACKGROUND

Reducing power consumption in integrated circuits remains a challenge. One technique for reducing power consumption in digital integrated circuits, commonly referred to as clock gating (CG), is to disable the clock signal applied to synchronous storage devices (e.g., flip-flops) when the stored data remains unchanged.

Clock gating may be achieved using combinational or sequential logic. In a combinational clock gating technique, an enabling/disabling signal is generated from the data available in the same clock cycle in which the clock to be applied to the sequential logic is turned off. In a fanin-based sequential clock gating (SEQCG) technique, the clock signal of a flip-flop is turned off using an enabling/disabling signal to ensure that none of the flip-flop's data drivers have changed states in the previous clock cycle. In a fanout-based SEQCG technique, the clock signal of the flip-flop is turned off when the flip-flop's output signal is not ready for loading in a subsequent clock cycle.

SUMMARY

A circuit, in accordance with one embodiment of the present disclosure, includes, in part, first and second sequential elements and a clock gating circuit. The first sequential element has an enable terminal receiving a first enabling signal, a clock terminal receiving a first clock signal, a data input terminal and a data output terminal. The second sequential element has a clock terminal, and a data input terminal coupled to the data output terminal of the first sequential element. The clock gating circuit is coupled to the first and second sequential elements and includes, in part, a third sequential element configured to store data in response to the first enabling signal and a second enabling signal. The clock gating circuit is further configured to supply a second clock signal to the clock terminal of the second sequential element in response to an assertion of the second enabling signal and the data stored in the third sequential element. In one embodiment, the clock gating circuit is further configured to supply the second clock signal to the clock terminal of the second sequential element only once in response to the assertion of the second enabling signal and the data stored in the third sequential element.

In one embodiment, the clock gating circuit further includes, in part, a first logic gate performing a Boolean AND function and a first clock gating logic. The first logic gate is responsive to the second enabling signal and to an output signal of the third sequential element. The first clock gating logic is configured to supply the second clock signal in response to the first clock signal and an output signal of the first logic gate. In one embodiment, the first clock gating logic is configured to supply the second clock signal only once in response to the first clock signal and an output signal of the first logic gate.

In one embodiment, the clock gating circuit further includes, in part, a second logic gate performing a Boolean AND function. The second logic gate is responsive to the second enabling signal and the output signal of the third sequential element. The second logic gate is configured to generate an output signal to which the data terminal of the third sequential element is responsive.

In one embodiment, the clock gating circuit further includes, in part, a third logic gate performing a Boolean OR function. The third logic is configured to generate and apply a signal to the data terminal of the third sequential element gate in response to the output signal of the second logic gate and the first enabling signal.

In one embodiment, the first clock gating logic includes, in part, an inverter that receives the first clock signal and generates an inverted clock signal, a latch that receives the inverted clock signal and the output signal of the first logic gate, and an AND gate that is responsive to an output signal of the latch.

In one embodiment, the clock gating circuit further includes, in part, a second logic gate performing a Boolean OR function. The second logic gate is configured to generate and apply a signal to an enable terminal of the third sequential element in response to the first and second enabling signal. The first enabling signal is applied to the data terminal of the third sequential element.

In one embodiment, the clock gating circuit further includes, in part, a second logic gate performing a Boolean OR function, and a second clock gating logic. The second logic gate is configured to receive the first and second enabling signal. The second clock gating logic is configured to generate and apply a signal to the clock terminal of the third sequential element in response to an output signal of the second logic gate and the first clock signal. The first enabling signal is applied to the data terminal of the third sequential element.

A method of controlling transfer of a first data from a first sequential element to a second sequential element, in accordance with one embodiment of the present disclosure, includes, in part, applying a first enabling signal to an enable terminal of the first sequential element configured to receive the first data at its data input terminal and a first clock signal at its clock terminal, coupling a data input terminal of the second sequential element to a data output terminal of the first sequential element, storing a second data in a third sequential element in response to the first enabling signal and a second enabling signal, and supplying a second clock signal to the second sequential element to enable the transfer of the first data from the first sequential element to the second sequential element only once in response to an assertion of the second enabling signal and the stored second data. In one embodiment, the supply of the second clock signal to the second sequential element to enable the transfer of the first data from the first sequential element to the second sequential element is carried out only once in response to the assertion of the second enabling signal and the stored second data.

A non-transitory computer readable storage medium, in accordance with one embodiment of the present disclosure includes, in part, stored instructions which when executed by a processor causes the processor to generate design data representative of a first sequential element having an enable terminal receiving a first enabling signal, a clock terminal receiving a first clock signal, and a data input terminal and a data output terminal. The stored instructions, when executed by the processor, further causes the processor to generate design data representative of a second sequential element having a data input terminal coupled to the data output terminal of the first sequential element. The stored instructions, when executed by the processor, further causes the processor to generate design data representative of a clock gating circuit coupled to the first and second sequential elements. The clock gating circuit includes, in part, a third sequential element configured to store data in response to the first enabling signal and a second enabling signal. The clock gating circuit is further configured to apply a second clock signal to a clock terminal of the second sequential element in response to an assertion of the second enabling signal and the data stored in the third sequential element. In one embodiment, the clock gating circuit is further configured to apply the second clock signal to the clock terminal of the second sequential element only once in response to the assertion of the second enabling signal and the data stored in the third sequential element

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

An important consideration in designing integrated circuits (ICs) and system-on-chips (SoCs) is power consumption. To reduce power consumption of synchronous digital designs in ICs and SoCs, a fanin-based sequential clock gating (SEQCG) circuit may be used.

Figure 1:
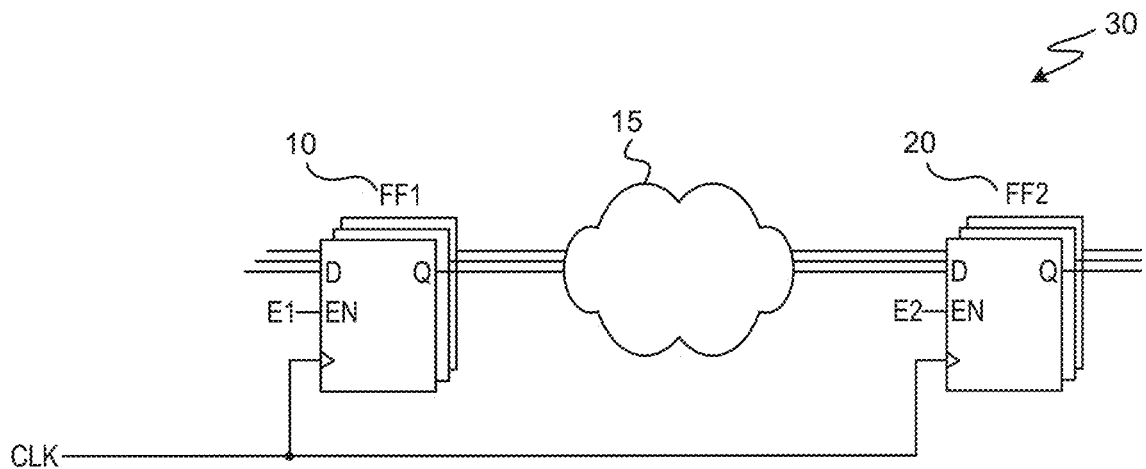
FIG. 1 is a simplified high-level block diagram of a circuit, as known in the prior art.

FIG. 1 is a simplified high-level block diagram of a logic circuit 30 shown as including a first bank of flip-flops (FF1) 10, a second bank of flip-flops 20 (FF2), and a combinational logic cloud 15 disposed between the two flip-flop banks. Each flip-flop in the first bank 10 includes an enable pin (terminal) receiving signal E1, and each flip-flop in the second bank 20 includes an enable pin receiving signal E2. The flip-flops in both banks are shown as receiving the clock signal CLK. When signal E1 is disabled (e.g., receives a low logic level), the data stored in each of the flip-flops in bank 10 remains unchanged, and therefore the flip-flops in bank 20 are not required to load the data from the flip-flops in bank 10 in the next clock cycle. If the enable signal E2 applied to the flip-flops in bank 20 is tied to a constant high logic level, then each flip-flop in bank 20 loads the data present at its input terminal D at every clock cycle.

In accordance with embodiments of the present disclosure, a clock signal is enabled to propagate only once when new data is pending to be read. To achieve this, a sequential element sets a flag when new data is ready to be read. The flag is reset to 0 after the data is read. By suppressing the clock propagation when the flag is in a reset state, the number of clock transitions is substantially reduced, thereby reducing the power consumption of the flip-flops as well as a clock tree disposed in the IC.

Figure 2:
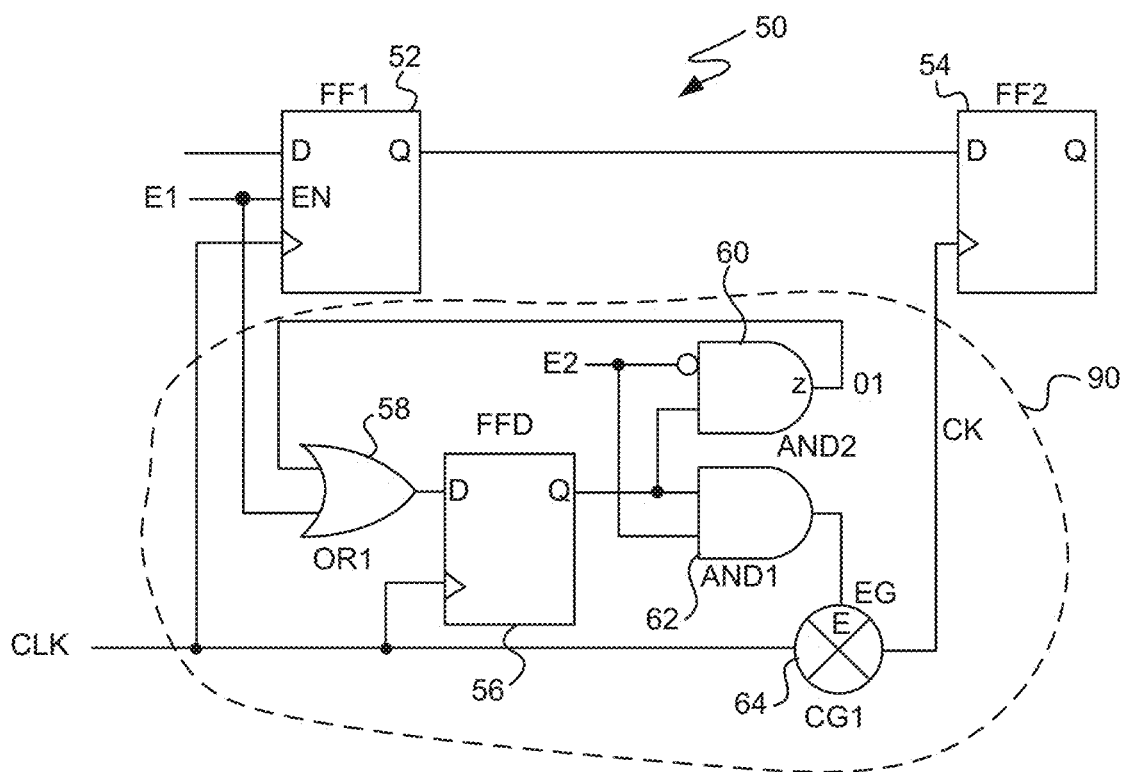
FIG. 2 is a schematic diagram of a circuit, in accordance with one embodiment of the present disclosure.

FIG. 2 is a block diagram of a fanin-based sequential clock gating circuit 50, in accordance with one embodiment of the present disclosure. Circuit 50 is shown as including sequential elements (e.g., flip-flops) FF1 52, FF2 54, as well as clock gating circuit 90 that is configured to control the transfer of data from flip-flop 52 to flip-flop 54. Clock gating circuit 90 is shown as including flip-flop (FFD) 56, logic gates OR1 58, AND2 60, AND1 62, and clock gating logic (CG1) 64. The clock signal CLK is applied to the clock terminals of flip-flops 52 and 56. A first enabling signal E1 is applied to the enable terminal EN of flip-flop 52 and to one of the input terminals of OR gate 58.

The output signal of flip-flop 56 is applied to a first input terminal of each of AND gates 60 and 62. A second enabling signal E2 is applied to the second input terminal of each of AND gates 60 and 62. The input terminal of AND gate 60 receiving signal E2 is an inverting terminal, and therefore, the output signal of AND gate 60 is at a high logic level (i.e., 1 or logic high) when the output signal of flip-flop 56 is at a logic high, and when signal E2 is at a logic low. The output signal of AND gate 60 is applied to the second input terminal of OR gate 58. The output signal of AND gate 62 is applied to a first input terminal of clock gating logic 64 which receives signal CLK at its second input terminal. The output signal of clock gating logic 64, namely signal CK, is applied to the clock input terminal of flip-flop 54.

When signal E1 is enabled (i.e., is at a logic high in the example shown in FIG. 2), the data present at the data terminal of flip-flop 52 is loaded in flip-flop 52 during the next transition of clock signal CLK (e.g., low-to-high transition of signal CLK in the example shown in FIG. 2). The high logic level of signal E1 causes the output of OR gate 58, and thus the data at the input terminal of flip-flop 56 to be set to a logic 1. Therefore, during the next low-to-high transition of signal CLK, a logic 1 is loaded and stored in flip-flop 56. Signal E2 may be disabled (i.e., set to a logic low level in the example shown in FIG. 2) after signal E1 is enabled.

With signal E2 at a logic low level and the output of flip-flop 56 at a logic high level, the output of AND gate 60, which is applied to an input terminal of OR gate 58, is set to a logic high level. Therefore, even after signal E1 is disabled (alternatively referred to herein as deasserted), the output of flip-flop 56 remains at a logic high level. So long as signal E2 remains at a logic low level, the output of AND gate 62 remains at a logic low level (alternatively referred to herein as low), thereby preventing the clock signal CLK from being applied to the clock terminal of flip-flop 54.

When signal E2 is subsequently set to a logic high level, the output of AND gate 62 goes high, thereby enabling the clock signal CLK to propagate through clock gating logic 64 and be applied to the clock terminal of flip-flop 54. On the next rising edge of signal CLK, the data at the output of flip-flop 52 is loaded in flip-flop 54. Therefore, in accordance with embodiments of the present disclosure, the clock signal CLK is received by clock terminal of flip-flop 54 only when required to load the data present at its input terminal.

Figure 3:
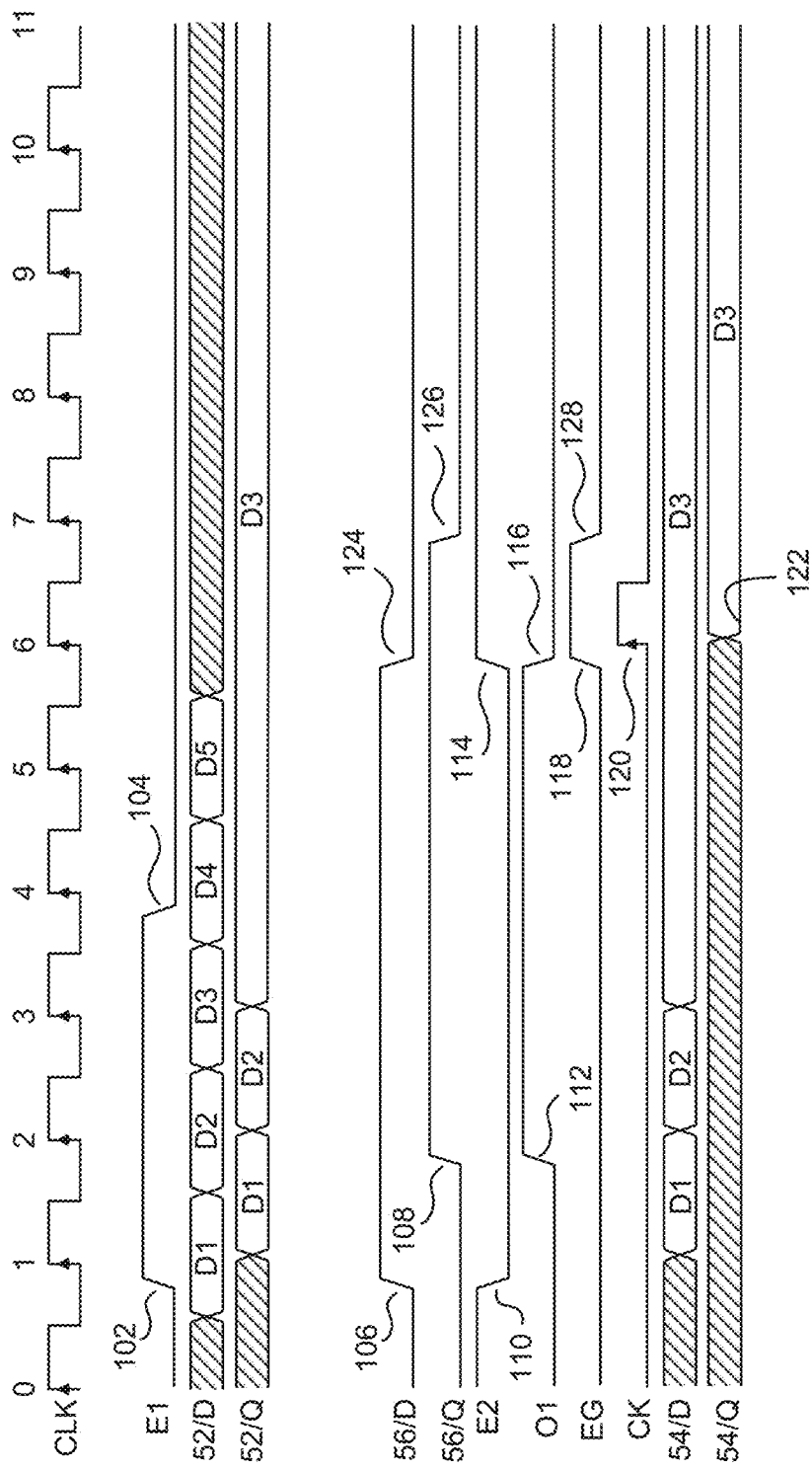
FIG. 3 is a timing diagram of a number of signals associated with the circuit shown in FIG. 2, in accordance with one embodiment of the present disclosure.

FIG. 3 is a timing diagram of a number of signals associated with clock gating circuit 50 during 10 successive cycles of the clock signal CLK. Signal E1 is shown as being enabled (alternatively referred to herein as asserted) at 102 prior to the rising edge of signal CLK in cycle 1, and disabled (deasserted) at 104 prior to the rising edge of signal CLK in cycle 4. Therefore, flip-flop 52 stores the incoming data D1, D2 and D3 during the first, second and third clock cycles. The input (D) and output (Q) signals of flip-flop 52 are identified in FIG. 3 as 52/D and 52/Q respectively.

When signal E1 goes high at 102, the output of OR gate 58 (identified in FIG. 3 as 56/D) goes high at 106, thereby causing the output of flip-flop 56 (identified in FIG. 3 as 56/Q) to go high at 108 in response to the rising edge of the clock signal in cycle 2 of the clock CLK. Signal E2 is shown as going low at 110 before the rising edge of the clock signal in cycle 1. In response to signal E2 going low at 110, and the output of flip-flop 56 going high at 108, the output signal O1 of AND gate 60 goes high at 112.

At 114, which is shown to occur during the fifth cycle of the clock, signal E2 is enabled by going high. This causes the output signal O1 of AND gate 60 to go low at 116, and the output signal EG of AND gate 62 to go high at 118. The high logic level of signal EG enables the clock signal to pass through clock gating logic 64, thereby enabling signal CK to make a low-to-high transition at 120 during the sixth cycle of the clock signal CLK. The output signal of clock gating logic 64 is shown as supplying signal CK which is applied to the clock terminal of flip-flop 54. The rising transition of signal CK at 120 causes data D3 present at the input terminal of flip-flop 52 (identified in FIG. 3 as 54/D) to be loaded into flip-flop 54 at 122 (identified in FIG. 3 as 54/Q).

The low logic level of signal O1 at 116 together with the low logic level of signal E1 after 104, cause the data at the input terminal of flip-flop 56 to change to a low level at 124. In response to the rising edge of the clock signal CLK during the seventh clock cycle, the output signal of flip-flop 56 goes low at 126, in turn causing signal EG to go low at 128. As is seen from the above description, the clock signal CK, received by flip-flop 54, makes a low-to-high transition only once at 120 so as to enable the data from flip-flop 52 to be loaded in flip-flop 54. Therefore, because clock signal CK transitions only once to enable the data to be loaded in flip-flop 54 from flip-flop 52 after signal E2 is enable, clock gating circuit 50, in accordance with embodiments of the present disclosure, has a substantially reduced power consumption.

Figure 4:
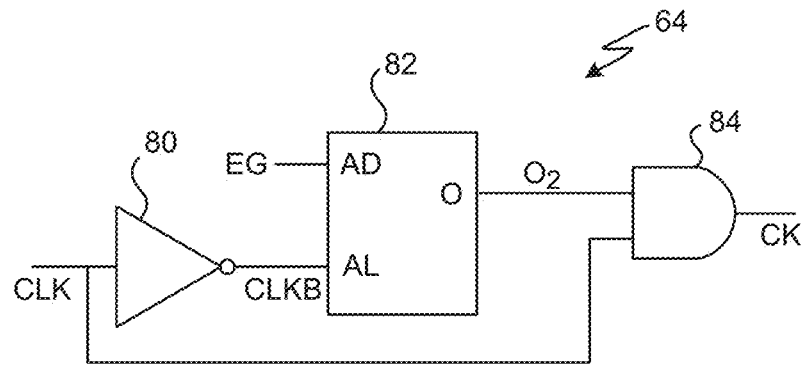
FIG. 4 is a schematic diagram of a clock gating logic CG1 used in the circuit of FIG. 2.

FIG. 4 is a schematic diagram of clock gating logic 64, in accordance with one embodiment. Inverter 80 inverts the signal CLK and generate signal CLKB which is applied to terminal AL of latch 82. The second terminal of latch 82 receives signal EG. Logic AND gate 84 is configured to receive the output signal O2 of latch 82, as well as the signal CLK to generate signal CK which is applied to flip-flop 54, as shown in FIG. 2.

Figure 5:
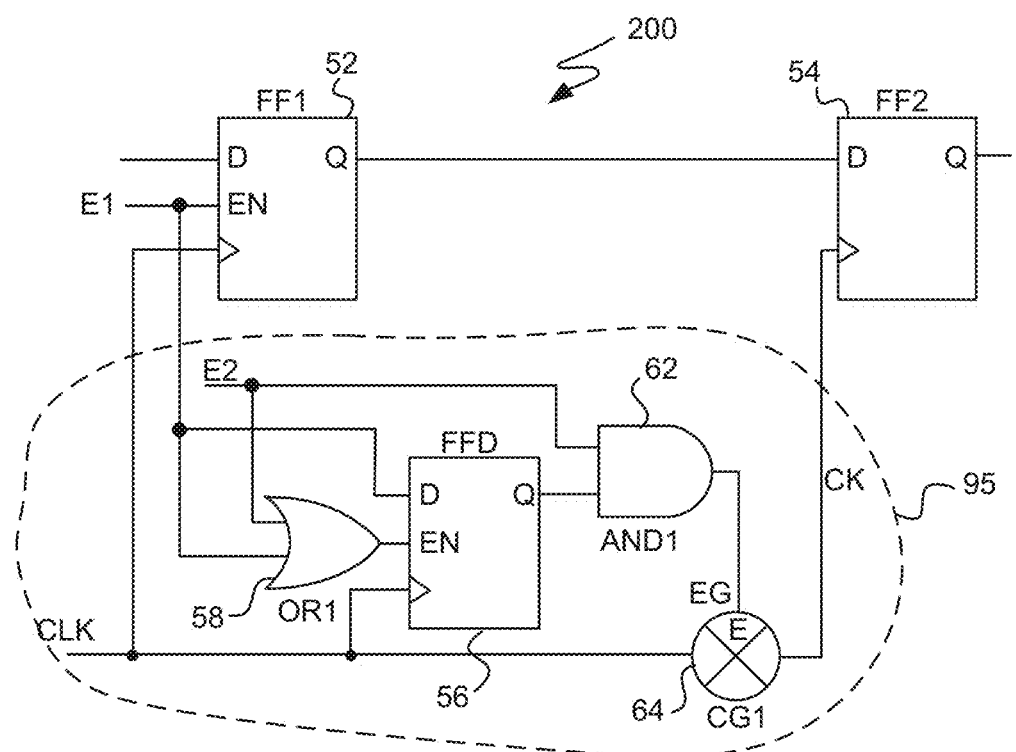
FIG. 5 is a schematic diagram of a circuit, in accordance with another embodiment of the present disclosure.

FIG. 5 is a block diagram of a fanin-based sequential clock gating circuit 200, in accordance with another embodiment of the present disclosure. Circuit 200 is shown as including flip-flops 52, 54, as well as clock gating circuit 95 that is configured to control the transfer of data from flip-flop 52 to flip-flop 54. Clock gating circuit 95 is shown as including logic gates 58, 62, and clock gating logic 64. The clock signal CLK is applied to the clock terminals of flip-flops 52 and 56. A first enabling signal E1 is applied to the enable terminal EN of flip-flop 52, to the data terminal D of flip-flop 56, and to one of the input terminals of OR gate 58.

The output signal of flip-flop 56 is applied to an input terminal of AND gate 62. A second enabling signal E2 is applied to the second input terminals of each of AND gate 62 and OR gate 58. The output signal of AND gate 62 is at a high logic level when the output signal Q of flip-flop 56 and signal E2 are both at a high logic level. The output signal EG of AND gate 62 is applied to a first input terminal of clock gating logic 64 which is configured to receive the clock signal CLK at its second input terminal. The output signal of clock gating logic 64, namely signal CK, is applied to the clock terminal of flip-flop 54.

When signal E1 is at a logic high level, the data present at the data terminal of flip-flop 52 is loaded in flip-flop 52 during the next transition of clock signal CLK. The high logic level of signal E1 causes the output of OR gate 58, and thus the enable terminal EN of flip-flop 56, to be set to a logic high level. Therefore, during the next low-to-high transition of signal CLK, the high logic level present at the data input terminal D of flip-flop 56 is loaded and stored in flip-flop 56.

Figure 6:
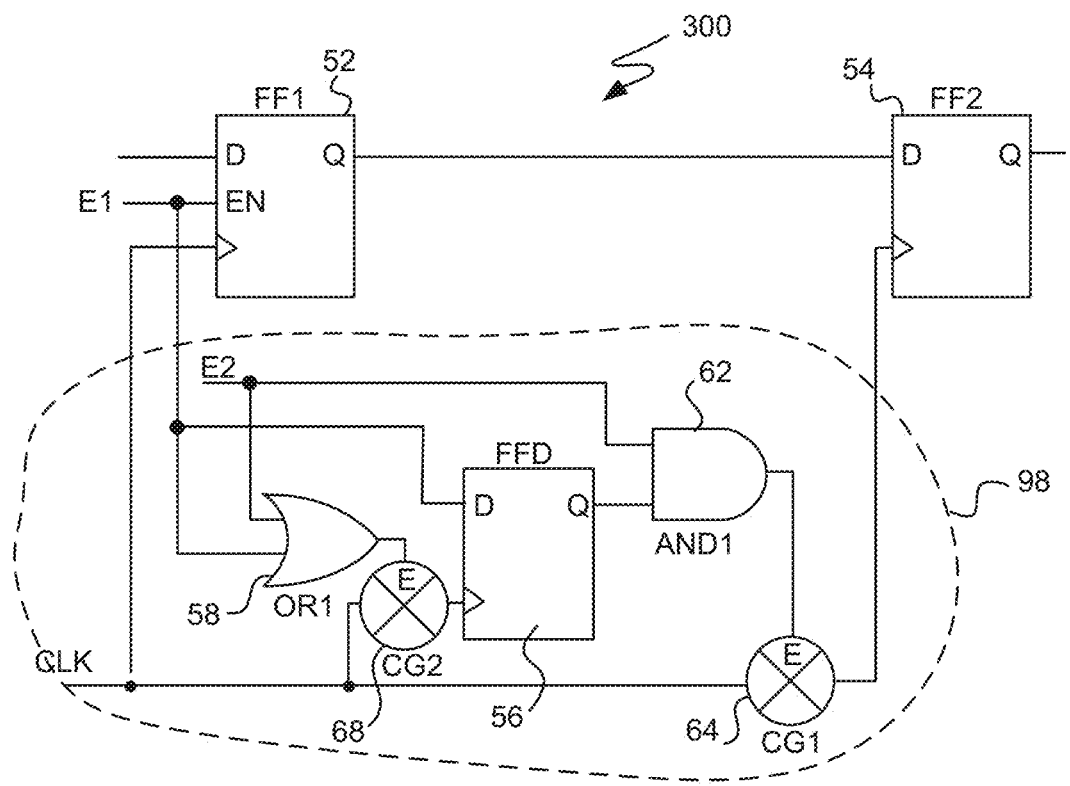
FIG. 6 is a schematic diagram of a circuit, in accordance with another embodiment of the present disclosure.

As long as signal E2 remains at a logic low level, the output of AND gate 62 remains low, thereby preventing the clock signal CK from being applied to the clock terminal of flip-flop 54. When signal E2 is raised to a logic high level, the output of AND gate 62 goes high, thereby enabling the clock signal CLK to propagate through clock gating logic 64—as signal CK—and be applied to the clock terminal of flip-flop 54. On the next rising edge of signal CK, the data at the output of flip-flop 52 is transferred and loaded in flip-flop 54. Therefore, in accordance with embodiments of the present disclosure, because clock signal CK transitions only once to enable the data to be loaded in flip-flop 54 from flip-flop 52 after signal E2 is enable, clock gating circuit 200, has a substantially reduced power consumption FIG. 6 is a block diagram of a fanin-based sequential clock gating circuit 300, in accordance with another embodiment of the present disclosure. Circuit 300 is similar to circuit 200 except that in circuit 300 the output of OR gate 58 is applied to the clock gating logic 68 whose output is applied to the clock terminal of flip-flop 56. Clock gating logic 68 is similar to clock gating logic 64 where a more detailed of view of which is shown in FIG. 4.

Figure 7:
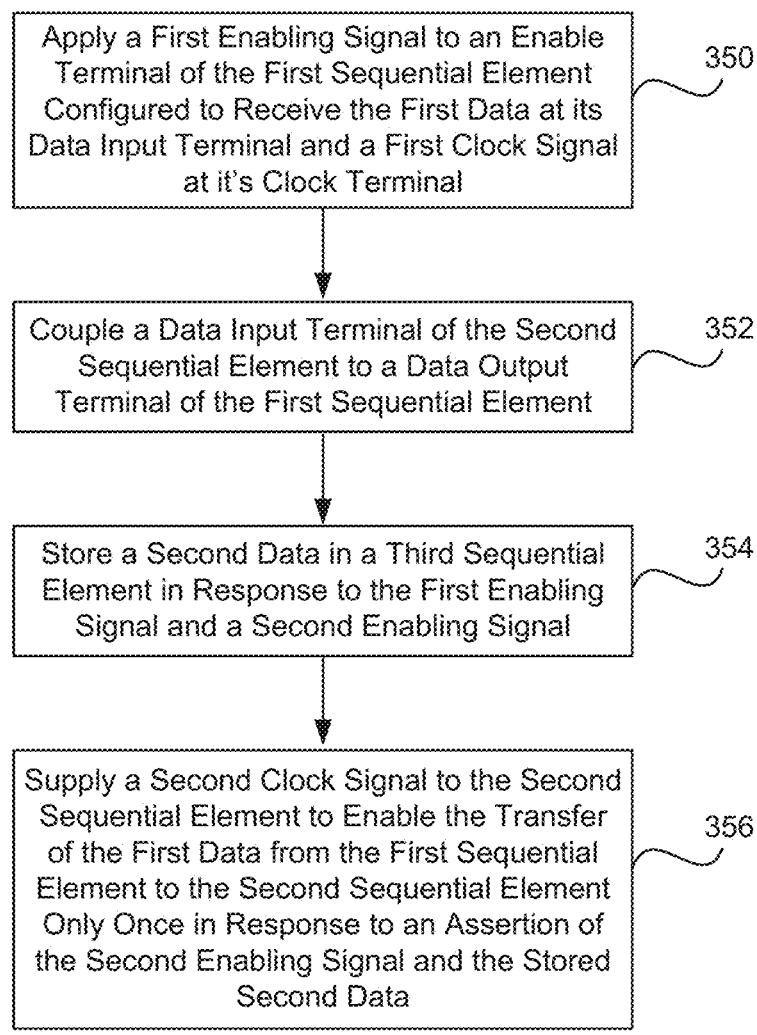
FIG. 7 is a flowchart for transferring the data from a first sequential element to a second sequential element, in accordance with one embodiment of the present disclosure.

FIG. 7 is a flowchart for controlling transfer of data from a first sequential element to a second sequential element, in accordance with one exemplary embodiment of the present disclosure. At 350, a first enabling signal is applied to an enable terminal of the first sequential element that is configured to receive the first data at its data input terminal and a first clock signal at its clock terminal. At 352, the data input terminal of the second sequential element is coupled to a data output terminal of the first sequential element. At 354, a second data is stored in a third sequential element in response to the first enabling signal and a second enabling signal. At 356, a second clock signal is applied to the second sequential element to enable the transfer of the first data from the first sequential element to the second sequential element. The second clock signal is generated only once in response to an assertion of the second enabling signal and the stored second data.

Figure 8:
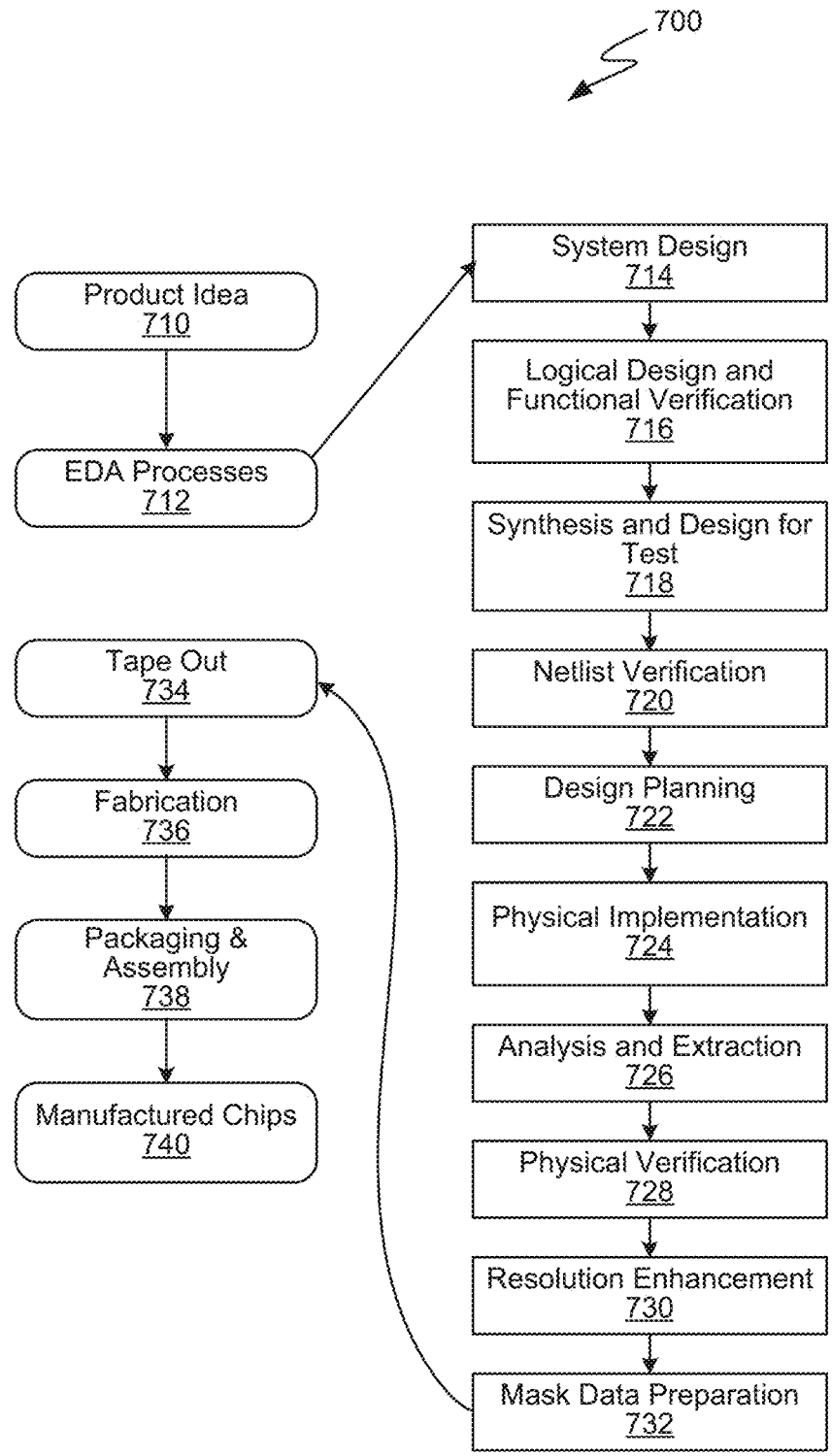
FIG. 8 depicts a flowchart of various processes used during the design and manufacture of an integrated circuit in accordance with some embodiments of the present disclosure.

FIG. 8 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
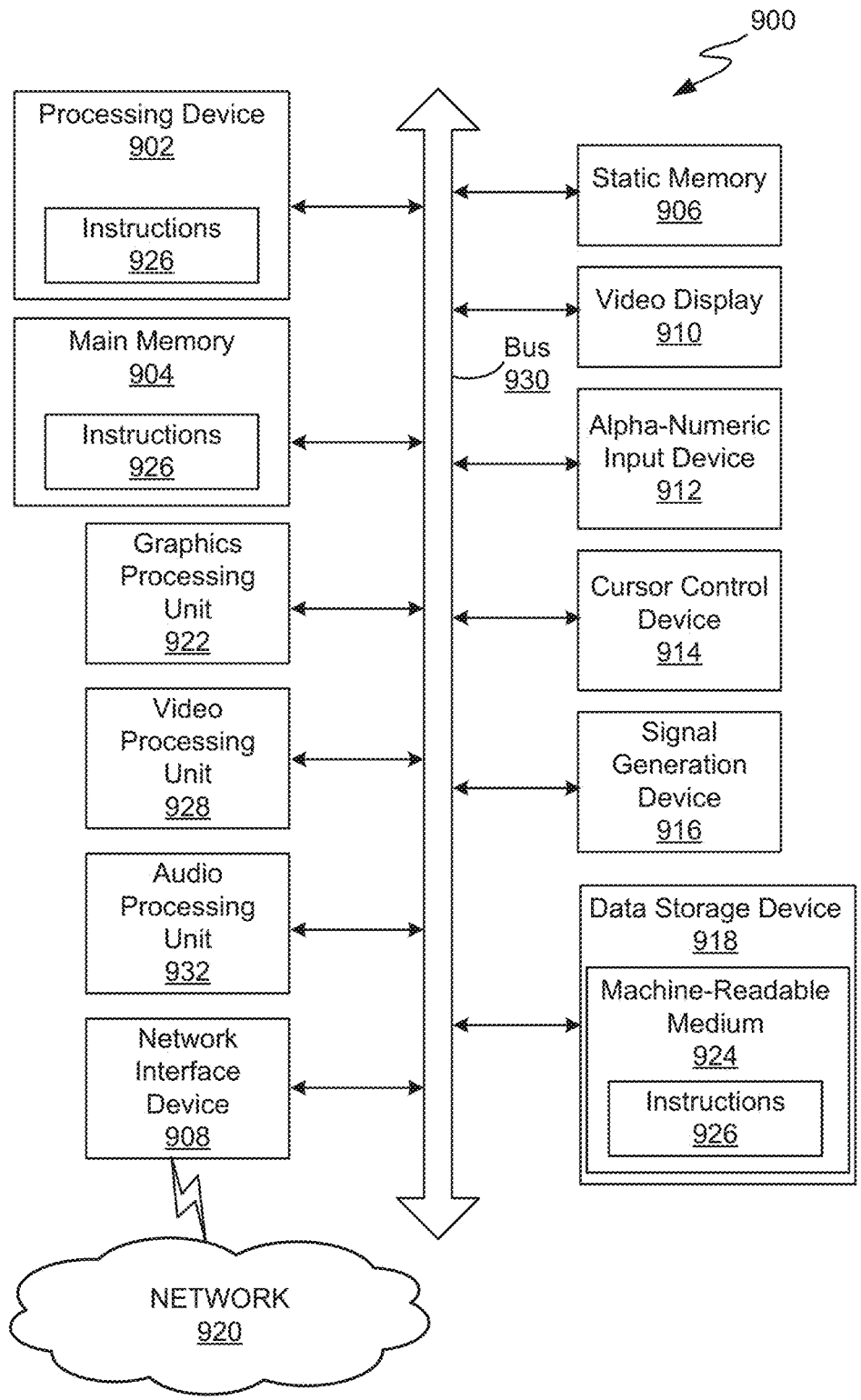
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A circuit comprising:
   a first sequential element having an enable terminal receiving a first enabling signal, a clock terminal receiving a first clock signal, a data input terminal and a data output terminal;
   a second sequential element having a clock terminal, and a data input terminal coupled to the data output terminal of the first sequential element; and
   a clock gating circuit coupled to the first and second sequential elements and comprising a third sequential element configured to store data in response to the first enabling signal and a second enabling signal, wherein the clock gating circuit is further configured to supply a second clock signal to the clock terminal of the second sequential element in response to an assertion of the second enabling signal and the data stored in the third sequential element.

2. The circuit of claim 1, wherein the clock gating circuit further comprises:
   a first logic gate performing a Boolean AND function, the first logic gate responsive to the second enabling signal and to an output signal of the third sequential element; and
   a first clock gating logic configured to supply the second clock signal in response to the first clock signal and an output signal of the first logic gate.

3. The circuit of claim 2, wherein the clock gating circuit further comprises:
   a second logic gate performing a Boolean AND function, the second logic gate responsive to the second enabling signal and the output signal of the third sequential element, wherein the second logic gate is configured to generate an output signal to which the data terminal of the third sequential element is responsive.

4. The circuit of claim 3, wherein the clock gating circuit further comprises:
   a third logic gate performing a Boolean OR function, wherein the third logic is configured to generate and apply a signal to the data terminal of the third sequential element gate in response to the output signal of the second logic gate and the first enabling signal.

5. The circuit of claim 4 wherein the first clock gating logic comprises:
   an inverter receiving the first clock signal and generating an inverted clock signal;
   a latch receiving the inverted clock signal and the output signal of the first logic gate; and
   an AND gate responsive to an output signal of the latch.

6. The circuit of claim 2, wherein the clock gating circuit further comprises:
   a second logic gate performing a Boolean OR function, the second logic gate configured to generate and apply a signal to an enable terminal of the third sequential element in response to the first and second enabling signal, wherein the first enabling signal is applied to the data terminal of the third sequential element.

7. The circuit of claim 2, wherein the clock gating circuit further comprises:
   a second logic gate performing a Boolean OR function, the second logic gate configured to receive the first and second enabling signal; and
   a second clock gating logic configured to generate and apply a signal to the clock terminal of the third sequential element in response to an output signal of the second logic gate and the first clock signal, wherein the first enabling signal is applied to the data terminal of the third sequential element.

8. A method of controlling transfer of a first data from a first sequential element to a second sequential element, the method comprising:
   applying a first enabling signal to an enable terminal of the first sequential element configured to receive the first data at its data input terminal and a first clock signal at its clock terminal;
   coupling a data input terminal of the second sequential element to a data output terminal of the first sequential element;
   storing a second data in a third sequential element in response to the first enabling signal and a second enabling signal; and
   supplying a second clock signal to the second sequential element to enable the transfer of the first data from the first sequential element to the second sequential element in response to an assertion of the second enabling signal and the stored second data.

9. The method of claim 8 further comprising:
   performing a first Boolean AND operation on the second enabling signal and the stored second data; and
   generating the second clock signal in response to the first clock signal and a result of the first Boolean AND operation.

10. The method of claim 9 further comprising:
    performing a second Boolean AND operation on the second enabling signal and the stored second data; and
    causing the stored second data to change in response to a result of the second Boolean operation.

11. The method of claim 10 further comprising:
    performing a Boolean OR operation on the first enabling signal and the result of the second Boolean AND operation; and
    applying a result of the Boolean OR operation to a data terminal of the third sequential element.

12. The method of claim 11 further comprising:
    latching the first clock signal; and
    generating the second clock signal from the latched first clock signal.

13. The method of claim 9 further comprising:
    performing a Boolean OR operation on the first and second enabling signals;
    applying a result of the second Boolean operation to an enable terminal of the third sequential element; and
    applying the first enabling signal to a data terminal of the third sequential element.

14. The method of claim 9 further comprising:
    performing a Boolean OR operation on the first and second enabling signals;
    applying a result of the second Boolean operation to a clock gating logic configured to receive the first clock signal; and
    applying the first enabling signal to a data terminal of the third sequential element.

15. A non-transitory computer readable storage medium comprising stored instructions representative of a circuit, the circuit comprising:
    a first sequential element having an enable terminal receiving a first enabling signal, a clock terminal receiving a first clock signal, a data input terminal and a data output terminal;

a second sequential element having a data input terminal coupled to the data output terminal of the first sequential element; and a clock gating circuit coupled to the first and second sequential elements and comprising a third sequential element configured to store data in response to the first enabling signal and a second enabling signal, wherein the clock gating circuit is further configured to apply a second clock signal to a clock terminal of the second sequential element in response to an assertion of the second enabling signal and the data stored in the third sequential element.

16. The non-transitory computer readable storage medium of claim 15 wherein the circuit further comprises:

a first logic gate performing a Boolean AND function, the first logic gate responsive to the second enabling signal and to an output signal of the third sequential element; and a first clock gating logic configured to supply the second clock signal in response to the first clock signal and an output signal of the first logic gate.

17. The non-transitory computer readable storage medium of claim 16 wherein the circuit further comprises:

a second logic gate performing a Boolean AND function, the second logic gate responsive to the second enabling signal and the output signal of the third sequential element, wherein the second logic gate is configured to generate an output signal to which the data terminal of the third sequential element is responsive.

18. The non-transitory computer readable storage medium of claim 17 wherein the circuit further comprises:

a third logic gate performing a Boolean OR function, wherein the third logic is configured to generate and apply a signal to the data terminal of the third sequential element gate in response to the output signal of the second logic gate and the first enabling signal.

19. The non-transitory computer readable storage medium of claim 16 wherein the circuit further comprises:

a second logic gate performing a Boolean OR function, the second logic gate configured to generate and apply a signal to an enable terminal of the third sequential element in response to the first and second enabling signal, wherein the first enabling signal is applied to a data terminal of the third sequential element.

20. The non-transitory computer readable storage medium of claim 16 wherein the circuit further comprises:

a second logic gate performing a Boolean OR function, the second logic gate configured to receive the first and second enabling signal; and a second clock gating logic configured to generate and apply a signal to the clock terminal of the third sequential element in response to an output signal of the second logic gate and the first clock signal, wherein the first enabling signal is applied to a data terminal of the third sequential element.

\* \* \* \* \*